(12) United States Patent
Lian et al.

(10) Patent No.: US 9,380,027 B1
(45) Date of Patent: Jun. 28, 2016

(54) CONDITIONAL DECLARATIVE POLICIES

(71) Applicant: vArmour Networks, Inc., Mountain View, CA (US)

(72) Inventors: Jia-Jyi Lian, Saratoga, CA (US); Anthony Paterra, Sunnyvale, CA (US); Marc Woolward, Bude (GB)

(73) Assignee: vArmour Networks, Inc., Mountain View, CA (US)

( * ) Notice: Subject to any disclaimer, the term of this patent is extended or adjusted under 35 U.S.C. 154(b) by 0 days.

(21) Appl. No.: 14/673,640

(22) Filed: Mar. 30, 2015

(51) Int. Cl.
*H04L 29/06* (2006.01)
*H04L 12/24* (2006.01)

(52) U.S. Cl.
CPC ........ *H04L 63/0263* (2013.01); *H04L 41/0893* (2013.01); *H04L 63/20* (2013.01)

(58) Field of Classification Search
CPC .................................................... H04L 63/20
See application file for complete search history.

(56) References Cited

U.S. PATENT DOCUMENTS

| | | | |
|---|---|---|---|
| 6,253,321 B1 | 6/2001 | Nikander et al. | |
| 6,578,076 B1 | 6/2003 | Putzolu | |
| 6,765,864 B1 | 7/2004 | Natarajan et al. | |
| 6,970,459 B1 | 11/2005 | Meier | |
| 6,992,985 B1 | 1/2006 | Das | |
| 7,028,179 B2 | 4/2006 | Anderson et al. | |
| 7,058,712 B1 | 6/2006 | Vasko et al. | |
| 7,062,566 B2 | 6/2006 | Amara et al. | |
| 7,397,794 B1 | 7/2008 | Lacroute et al. | |
| 7,464,407 B2 | 12/2008 | Nakae et al. | |
| 7,620,986 B1 | 11/2009 | Jagannathan et al. | |
| 7,742,414 B1 | 6/2010 | Iannaccone et al. | |
| 7,774,837 B2 | 8/2010 | McAlister | |
| 7,849,495 B1 | 12/2010 | Huang et al. | |
| 7,900,240 B2 * | 3/2011 | Terzis et al. | 726/2 |
| 8,051,460 B2 | 11/2011 | Lum et al. | |
| 8,259,571 B1 | 9/2012 | Raphel et al. | |
| 8,274,912 B2 | 9/2012 | Wray et al. | |
| 8,296,459 B1 | 10/2012 | Brandwine et al. | |
| 8,307,422 B2 | 11/2012 | Varadhan et al. | |
| 8,321,862 B2 | 11/2012 | Swamy et al. | |
| 8,353,021 B1 * | 1/2013 | Satish et al. | 726/11 |
| 8,369,333 B2 | 2/2013 | Hao et al. | |

(Continued)

FOREIGN PATENT DOCUMENTS

WO   WO2011012165   2/2011

OTHER PUBLICATIONS

Specification, U.S. Appl. No. 14/677,827, filed Apr. 2, 2015.

(Continued)

*Primary Examiner* — Teshome Hailu
*Assistant Examiner* — Thanh Le
(74) *Attorney, Agent, or Firm* — Carr & Ferrell LLP

(57) ABSTRACT

Methods, systems, and media for producing a firewall rule set are provided herein. Exemplary methods may include receiving a declarative policy associated with a computer network security policy; collecting information from at least one external system of record; generating a firewall rule set using the declarative policy and information, the firewall rule set including addresses to or from which network communications are permitted, denied, redirected or logged, the firewall rule set being at a lower level of abstraction than the declarative policy; and provisioning the firewall rule set to a plurality of enforcement points of a distributed firewall, the firewall selectively policing network communications among workloads using the firewall rule set.

16 Claims, 5 Drawing Sheets

(56) References Cited

U.S. PATENT DOCUMENTS

| | | | |
|---|---|---|---|
| 8,396,986 | B2 | 3/2013 | Kanada et al. |
| 8,490,153 | B2 * | 7/2013 | Bassett et al. ............. 726/1 |
| 8,565,118 | B2 | 10/2013 | Shukla et al. |
| 8,612,744 | B2 | 12/2013 | Shieh |
| 8,726,343 | B1 | 5/2014 | Borzycki et al. |
| 8,798,055 | B1 | 8/2014 | An |
| 8,935,457 | B2 | 1/2015 | Feng et al. |
| 8,990,371 | B2 | 3/2015 | Kalyanaraman et al. |
| 9,258,275 | B2 | 2/2016 | Sun et al. |
| 9,294,302 | B2 | 3/2016 | Sun et al. |
| 9,294,442 | B1 | 3/2016 | Lian et al. |
| 2002/0031103 | A1 | 3/2002 | Wiedeman et al. |
| 2003/0014665 | A1 | 1/2003 | Anderson et al. |
| 2003/0177389 | A1 | 9/2003 | Albert et al. |
| 2004/0062204 | A1 | 4/2004 | Bearden et al. |
| 2004/0095897 | A1 | 5/2004 | Vafaei |
| 2005/0060573 | A1 | 3/2005 | D'Souza |
| 2005/0201343 | A1 | 9/2005 | Sivalingham et al. |
| 2006/0050696 | A1 | 3/2006 | Shah et al. |
| 2006/0137009 | A1 | 6/2006 | Chesla |
| 2007/0019621 | A1 | 1/2007 | Perry et al. |
| 2007/0079308 | A1 | 4/2007 | Chiaramonte et al. |
| 2007/0192863 | A1 | 8/2007 | Kapoor et al. |
| 2007/0271612 | A1 | 11/2007 | Fang et al. |
| 2008/0083011 | A1 | 4/2008 | McAlister et al. |
| 2008/0086772 | A1 | 4/2008 | Chesla |
| 2008/0155239 | A1 | 6/2008 | Chowdhury et al. |
| 2008/0301770 | A1 | 12/2008 | Kinder |
| 2009/0103524 | A1 | 4/2009 | Mantripragada et al. |
| 2009/0182835 | A1 | 7/2009 | Aviles et al. |
| 2009/0268667 | A1 | 10/2009 | Gandham et al. |
| 2010/0043068 | A1 | 2/2010 | Varadhan et al. |
| 2010/0095367 | A1 | 4/2010 | Narayanaswamy |
| 2010/0125900 | A1 | 5/2010 | Dennerline et al. |
| 2010/0189110 | A1 | 7/2010 | Kambhampati et al. |
| 2010/0228962 | A1 | 9/2010 | Simon et al. |
| 2010/0235880 | A1 | 9/2010 | Chen et al. |
| 2010/0333165 | A1 * | 12/2010 | Basak et al. ............. 726/1 |
| 2011/0003580 | A1 | 1/2011 | Belrose et al. |
| 2011/0069710 | A1 | 3/2011 | Naven et al. |
| 2011/0075667 | A1 | 3/2011 | Li et al. |
| 2011/0138384 | A1 | 6/2011 | Bozek et al. |
| 2011/0225624 | A1 | 9/2011 | Sawhney et al. |
| 2011/0249679 | A1 | 10/2011 | Lin et al. |
| 2011/0263238 | A1 | 10/2011 | Riley et al. |
| 2012/0017258 | A1 | 1/2012 | Suzuki |
| 2012/0113989 | A1 | 5/2012 | Akiyoshi |
| 2012/0131685 | A1 | 5/2012 | Broch et al. |
| 2012/0185913 | A1 * | 7/2012 | Martinez et al. ............. 726/1 |
| 2012/0207174 | A1 | 8/2012 | Shieh |
| 2012/0311144 | A1 | 12/2012 | Akelbein et al. |
| 2012/0311575 | A1 | 12/2012 | Song |
| 2013/0086383 | A1 | 4/2013 | Galvao de Andrade et al. |
| 2013/0086399 | A1 | 4/2013 | Tychon et al. |
| 2013/0097692 | A1 | 4/2013 | Cooper et al. |
| 2013/0152187 | A1 | 6/2013 | Strebe et al. |
| 2013/0166720 | A1 | 6/2013 | Takashima et al. |
| 2013/0219384 | A1 | 8/2013 | Srinivasan et al. |
| 2013/0223226 | A1 | 8/2013 | Narayanan et al. |
| 2013/0250956 | A1 | 9/2013 | Sun et al. |
| 2013/0275592 | A1 | 10/2013 | Xu et al. |
| 2013/0276092 | A1 | 10/2013 | Sun et al. |
| 2014/0022894 | A1 | 1/2014 | Oikawa et al. |
| 2014/0283030 | A1 | 9/2014 | Moore et al. |
| 2014/0298469 | A1 | 10/2014 | Marion et al. |
| 2015/0186296 | A1 | 7/2015 | Guidry |
| 2016/0028851 | A1 | 1/2016 | Shieh |

OTHER PUBLICATIONS

Specification, U.S. Appl. No. 14/673,679, filed Mar. 30, 2015.
Specification, U.S. Appl. No. 14/657,282, filed Mar. 13, 2015.
Specification, U.S. Appl. No. 14/839,649, filed Aug. 28, 2015.
Specification, U.S. Appl. No. 14/839,699, filed Aug. 28, 2015.
Specification, U.S. Appl. No. 14/657,210, filed Mar. 13, 2015.
Final Office Action, Dec. 2, 2015, U.S. Appl. No. 14/677,827, filed Apr. 2, 2015.
Notice of Allowance, Nov. 9, 2015, U.S. Appl. No. 13/847,881, filed Mar. 20, 2013.
Final Office Action, Dec. 3, 2015, U.S. Appl. No. 13/860,404, filed Apr. 10, 2014.
Non-Final Office Action, Jan. 28, 2016, U.S. Appl. No. 14/877,836, filed Oct. 7, 2015.

* cited by examiner

CONDITIONAL DECLARATIVE POLICIES

FIELD OF THE INVENTION

The present technology pertains to computer security, and more specifically to computer network security.

BACKGROUND ART

A hardware firewall is a network security system that controls incoming and outgoing network traffic. A hardware firewall generally creates a barrier between an internal network (assumed to be trusted and secure) and another network (e.g., the Internet) that is assumed not to be trusted and secure.

Attackers breach internal networks to steal critical data. For example, attackers target low-profile assets to enter the internal network. Inside the internal network and behind the hardware firewall, attackers move laterally across the internal network, exploiting East-West traffic flows, to critical enterprise assets. Once there, attackers siphon off valuable company and customer data.

SUMMARY OF THE INVENTION

Some embodiments of the present technology include methods for producing a firewall rule set which may include: receiving a declarative policy associated with a computer network security policy; collecting information from at least one external system of record; generating a firewall rule set using the declarative policy and information, the firewall rule set including addresses to or from which network communications are permitted, denied, redirected, and/or logged, the firewall rule set being at a lower level of abstraction than the declarative policy; and provisioning the firewall rule set to a plurality of enforcement points of a distributed firewall, the firewall selectively policing network communications among workloads using the firewall rule set.

Various embodiments of the present technology include systems for producing a firewall rule set comprising: a processor; and a memory communicatively coupled to the processor, the memory storing instructions executable by the processor to perform a method comprising: receiving a declarative policy associated with a computer network security policy, collecting information from at least one external system of record, generating a firewall rule set using the declarative policy and information, the firewall rule set including addresses to or from which network communications are permitted, denied, redirected, and/or logged, the firewall rule set being at a lower level of abstraction than the declarative policy, and provisioning the firewall rule set to a plurality of enforcement points of a distributed firewall, the firewall selectively policing network communications among workloads using the firewall rule set.

In some embodiments, the present technology includes non-transitory computer-readable storage media having embodied thereon a program, the program being executable by a processor to perform a method for producing a firewall rule set, the method comprising: receiving a declarative policy associated with a computer network security policy; collecting information from at least one external system of record; generating a firewall rule set using the declarative policy and information, the firewall rule set including addresses to or from which network communications are permitted, denied, redirected, and/or logged, the firewall rule set being at a lower level of abstraction than the declarative policy; and provisioning the firewall rule set to a plurality of enforcement points of a distributed firewall, the firewall selectively policing network communications among workloads using the firewall rule set.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments. The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
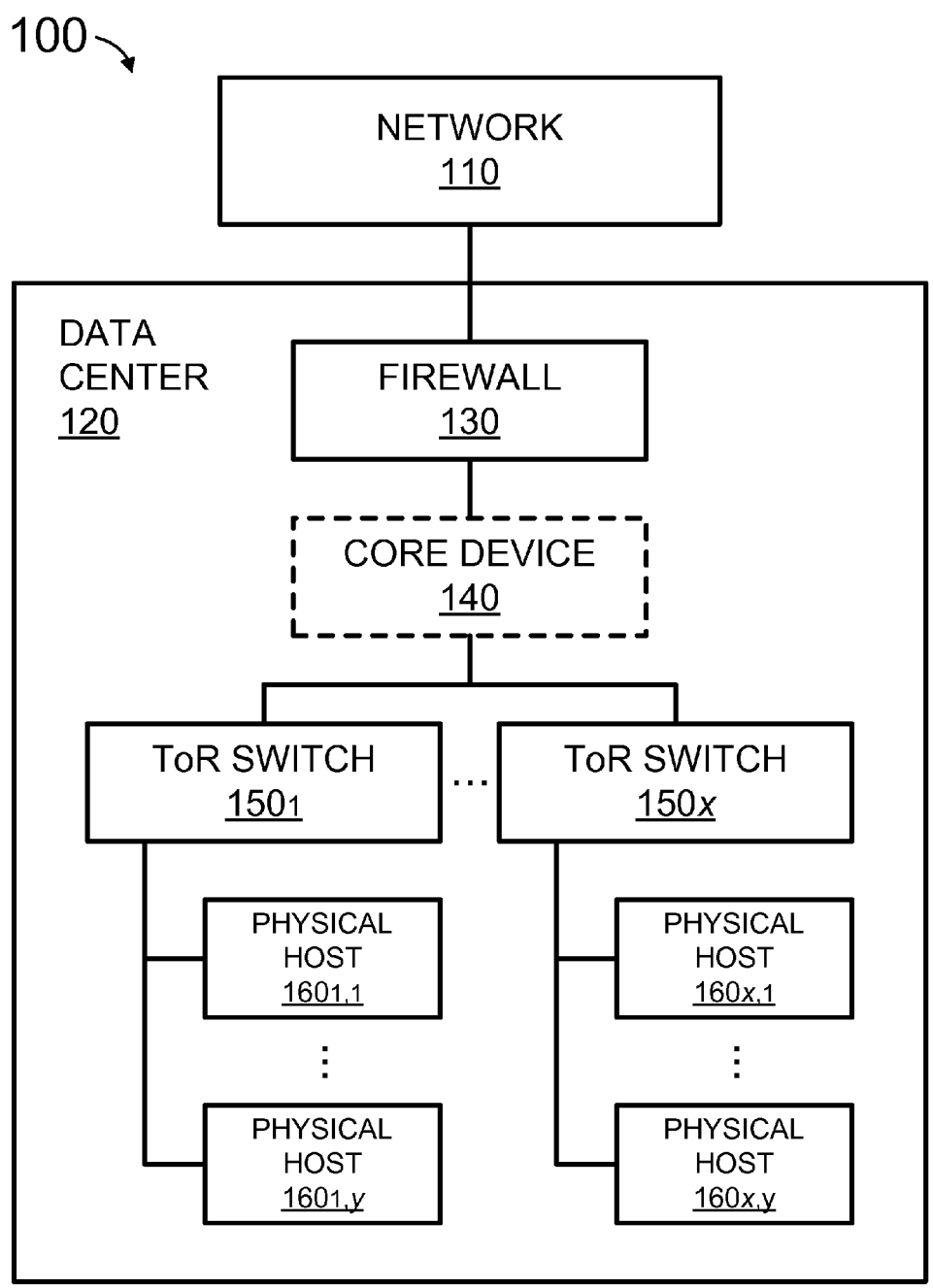
FIG. 1 is a simplified block diagram of a (physical) environment, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Information technology (IT) organizations face cyber threats and advanced attacks. Firewalls are an important part of network security. Firewalls control incoming and outgoing network traffic using a rule set. A rule, for example, allows a connection to a specific (Internet Protocol (IP)) address, allows a connection to a specific (IP) address if the connection is secured (e.g., using Internet Protocol security (IPsec)), blocks a connection to a specific (IP) address, redirects a connection from one IP address to another IP address, logs communications to and/or from a specific IP address, and the like. Firewall rules at a low level of abstraction indicate specific (IP) address and protocol to which connections are allowed and/or not allowed.

Managing a firewall rule set is a difficult challenge. Some IT security organizations have a large staff (e.g., dozens of staff members) dedicated to maintaining firewall policy (e.g., firewall rule set). A firewall rule set can have tens of thousands or even hundreds of thousands of rules.

Some embodiments of the present technology allow IT security organizations to generate and maintain a firewall rule set at a high-level of abstraction. Abstraction is a technique for managing complexity by establishing a level of complexity on which an IT security staff member interacts with the system, suppressing the more complex details below the current level. As explained below, desired network behavior can be specified in a high level description (e.g., a declarative statement such as "block high-risk traffic from going to high-value assets") and (dynamically) compiled to produce a (low-level) firewall rule set. For example, a firewall rule set includes (IP) addresses and is symbolically represented as: $10.0.0.3 \nrightarrow 10.1.2.3$, $10.0.2.3 \nrightarrow 10.1.2.3$, etc.

FIG. 1 illustrates a system 100 according to some embodiments. System 100 includes network 110 and data center 120. Data center 120 includes firewall 130, optional core switch/router (also referred to as a core device) 140, Top of Rack (ToR) switches $150_1$-$150_x$, and physical hosts $160_{1,1}$-$160_{x,y}$.

Network 110 (also referred to as a computer network or data network) is a telecommunications network that allows computers to exchange data. For example, in network 110, networked computing devices pass data to each other along data connections (e.g., network links). Data is transferred in the form of packets. The connections between nodes are established using either cable media or wireless media. For example, network 110 includes at least one of a local area network (LAN), wireless local area network (WLAN), wide area network (WAN), metropolitan area network (MAN), and the like. In some embodiments, network 110 includes the Internet.

Data center 120 is a facility used to house computer systems and associated components. Data center 120, for example, comprises computing resources for cloud computing services or operated for the benefit of a particular organization. Data center equipment, for example, is generally mounted in rack cabinets, which are usually placed in single rows forming corridors (e.g., aisles) between them. Firewall 130 creates a barrier between data center 120 and network 110 by controlling incoming and outgoing network traffic based on a rule set.

Optional core switch/router 140 is a high-capacity switch/router that serves as a gateway to network 110 and provides communications between ToR switches $150_1$ and $150_x$, and between ToR switches $150_1$ and $150_x$ and network 110. ToR switches $150_1$ and $150_x$ connect physical hosts $160_{1,1}$-$160_{1,y}$ and $160_{x,1}$-$160_{x,y}$ (respectively) together and to network 110 (optionally through core switch/router 140). For example, ToR switches $150_1$-$150_x$ use a form of packet switching to forward data to a destination physical host (of physical hosts $160_{1,1}$-$160_{1,y}$) and (only) transmit a received message to the physical host for which the message was intended.

Physical hosts $160_{1,1}$-$160_{x,y}$ are computing devices that act as computing servers such as blade servers. Computing devices are described further in relation to FIG. 5.

Figure 2:
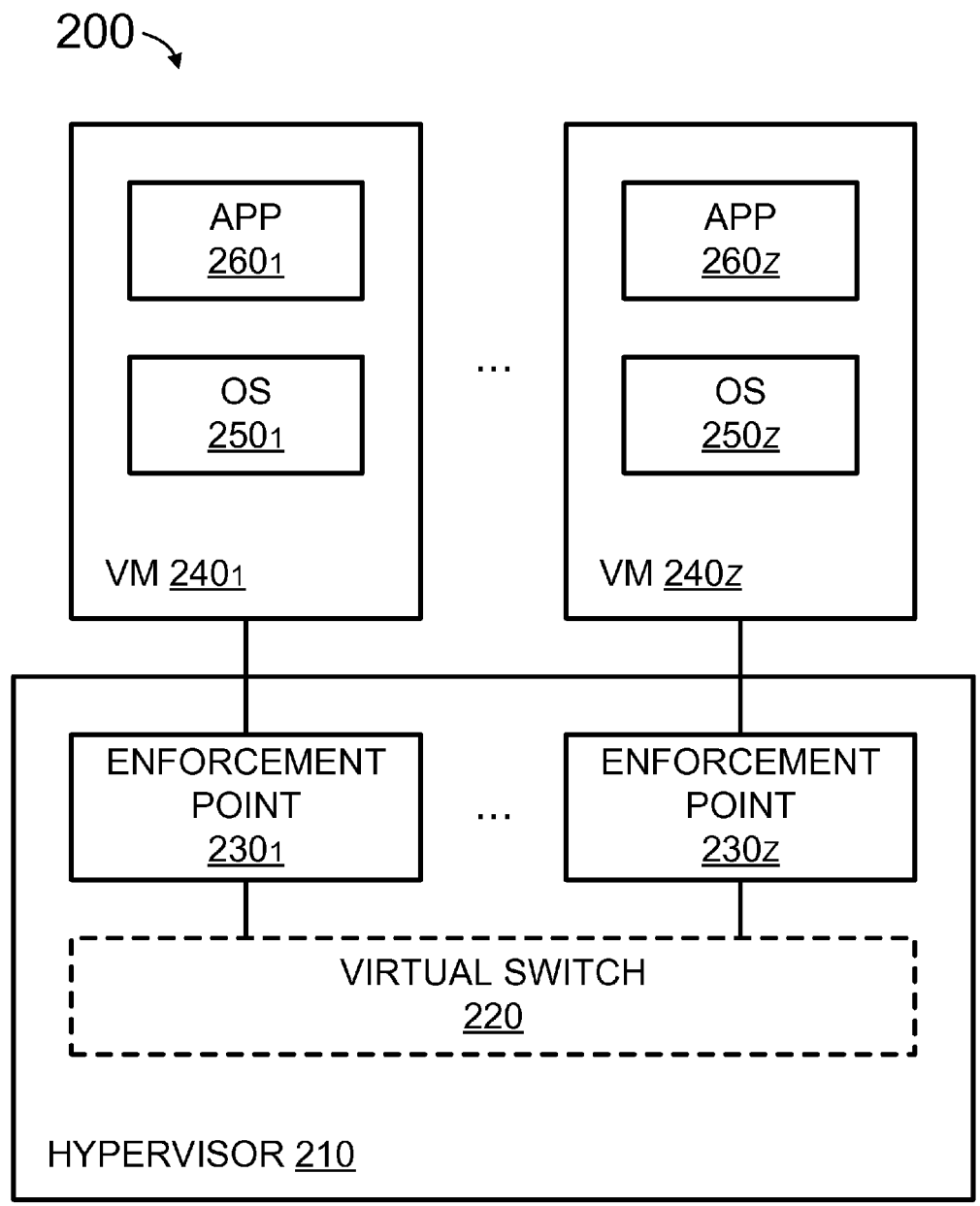
FIG. 2 is a simplified block diagram of a (virtual) environment, in accordance with various embodiments.

FIG. 2 depicts (virtual) environment 200 according to various embodiments. In some embodiments, environment 200 is implemented in at least one of physical hosts $160_{1,1}$-$160_{x,y}$ (FIG. 1). Environment 200 includes hypervisor 210 and virtual machines (VMs) $240_1$-$240_z$. Hypervisor 210 optionally includes virtual switch 220 and includes virtual firewall (also referred to as distributed firewall) enforcement points $230_1$-$230_z$. VMs $240_1$-$240_z$ each include a respective one of operating systems (OSes) $250_1$-$250_z$ and applications (APPs) $260_1$-$260_z$.

Hypervisor (also known as a virtual machine monitor (VMM)) 210 is software running on at least one of physical hosts $160_{1,1}$-$160_{x,y}$, and hypervisor 210 runs VMs $240_1$-$240_z$. A physical host (of physical hosts $160_{1,1}$-$160_{x,y}$) on which hypervisor 210 is running one or more virtual machines $240_1$-$240_z$, is also referred to as a host machine. Each VM is also referred to as a guest machine.

For example, hypervisor 210 allows multiple OSes $250_1$-$250_z$ to share a single physical host (of physical hosts $160_{1,1}$-$160_{x,y}$). Each of OSes $250_1$-$250_z$ appears to have the host machine's processor, memory, and other resources all to itself. However, hypervisor 210 actually controls the host machine's processor and resources, allocating what is needed to each operating system in turn and making sure that the guest OSes (e.g., virtual machines $240_1$-$240_z$) cannot disrupt each other. OSes $250_1$-$250_z$ are described further in relation to FIG. 4.

VMs $240_1$-$240_z$ also include applications $260_1$-$260_z$. Applications $260_1$-$260_z$ are programs designed to carry out operations for a specific purpose. Applications $260_1$-$260_z$ include at least one of web application (also known as web apps), web server, transaction processing, database, and like software. Applications $260_1$-$260_z$ run using a respective OS of OSes $250_1$-$250_z$.

Hypervisor 210 optionally includes virtual switch 220. Virtual switch 220 is a logical switching fabric for networking VMs $240_1$-$240_z$. For example, virtual switch 220 is a program running on a physical host (of physical hosts $160_{1,1}$-$160_{x,y}$) that allows a VM (of VMs $240_1$-$240_z$) to communicate with another VM.

Hypervisor 210 also includes virtual firewall enforcement points $230_1$-$230_z$. Virtual firewall (also referred to as distributed firewall) enforcement points $230_1$-$230_z$ are a firewall service that provides network traffic filtering and monitoring for VMs $240_1$-$240_z$. Virtual firewall enforcement points $230_1$-$230_z$ control network traffic to and from a VM (of VMs $240_1$-$240_z$) using a rule set. A rule, for example, allows a connection to a specific (IP) address, allows a connection to a specific (IP) address if the connection is secured (e.g., using IPsec), denies a connection to a specific (IP) address, redirects a connection from one IP address to another IP address (e.g., to a honeypot or tar pit), logs communications to and/or from a specific IP address, and the like. Each address is virtual, physical, or both. Connections are incoming to the respective VM, outgoing from the respective VM, or both. Redirection is described further in related U.S. patent application "System and Method for Threat-Driven Security Policy Controls" (application Ser. No. 14/673,679), which is hereby incorporated by reference for all purposes.

In some embodiments logging includes metadata associated with action taken by the physical and/or virtual firewall enforcement point, such as the permit, deny, and log behaviors. For example, for a Domain Name System (DNS) request, metadata associated with the DNS request, and the action taken (e.g., permit/forward, deny/block, redirect, and log behaviors) are logged. Activities associated with other (application-layer) protocols (e.g., Dynamic Host Configuration Protocol (DHCP), Domain Name System (DNS), File Transfer Protocol (FTP), Hypertext Transfer Protocol (HTTP), Internet Message Access Protocol (IMAP), Post Office Protocol (POP), Secure Shell (SSH), Secure Sockets Layer (SSL), Transport Layer Security (TLS), and the like) and their respective metadata may be additionally or alternatively logged.

Figure 3:
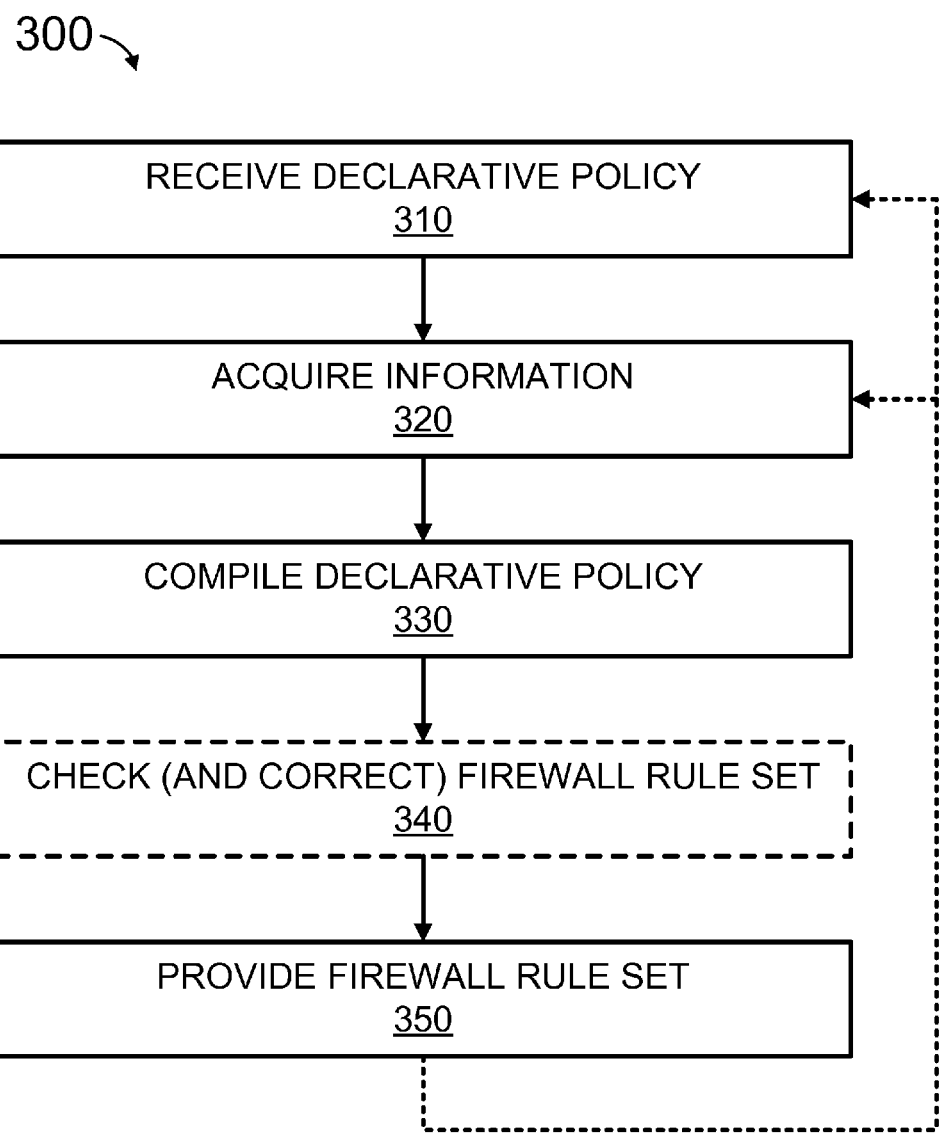
FIG. 3 is simplified flow diagram of a method, according to some embodiments.

FIG. 3 illustrates a method 300 for dynamically producing a low-level firewall rule set from a high level declarative statement (or policy), according to some embodiments. In various embodiments, method 300 is performed by a computing system, as described in relation to FIG. 5. At Step 310, at least one declarative policy is received. For example, the declarative policy is received from an IT security staff member via at least one of a graphical user interface (GUI), command-line interface (CLI), application programming interface (API), and the like. The IT security staff member can be a direct employee or contractor responsible for security (e.g., a trusted third-party arbiter of tenant policy requests, chief security officer, firewall administrator, etc.) who understands governance risk and compliance mandates for implementing the declarative policy. In some embodiments, the API is a Representational State Transfer (REST) API. In various embodiments, the received declarative policy is a collection of policies (e.g., a PCI asset allowed to communicate with a non-PCI asset, a non-PCI asset allowed to communicate with a PCI asset, a PCI asset with which access from a network (e.g., Internet) is not allowed, and the like). For example, the received declarative policy is in the form of a vArmour OS (vAOS) declarative policy table.

In some embodiments, a policy table includes a source, a destination, and an action. Each source and destination can be described at a high level. For example, each source and destination is at least one of: a PCI, non-PCI, high-value, high-risk, running a particular OS, at a particular geographic location, associated with sensitive data, having a particular application life cycle, and the like workload. Workloads are described further below. The action, for example, is to permit/forward, deny/block, or redirect communication. In various embodiments, a policy table (additionally) includes application metadata and is a next-generation firewall (NGFW) policy table for enforcing security policies at the application level. For example, an HTTP packet including a get request for varmour.com is reasonably determined to be going to varmour.com.

A declarative policy reflects a security intent of the responsible IT security organization. Declarative policies may be roughly divided into three types: compliance, security, and tenant policies. Compliance policies reflect requirements from government, industry, and the like. By way of non-limiting example, a compliance policy is a Payment Card Industry Data Security Standard (PCI DSS) requirement that PCI-compliant assets (e.g., physical host, VM, or both) are not allowed to communicate with non-PCI assets. Other examples include geolocation-based policies (e.g., sensitive data is not allowed outside of Switzerland) and data sensitivity (e.g., sensitive compartmented information (SCI) workloads can only be accessed by U.S. citizens). In some embodiments, determinations (e.g., of citizenship) include access of an external system of record (e.g., associated with Human Resources (HR) systems) at compile time and dynamic re-complile time.

PCI DSS is a proprietary information security standard for organizations that handle branded credit cards from the major card brands including Visa, MasterCard, American Express, Discover, and Japan Credit Bureau. The standard includes an (in-scope/out-of-scope) requirement that assets that store, process, and forward credit card information are not allowed to communicate with assets that do not (e.g., symbolically: PCI↮ non-PCI).

In various embodiments at compile time, an external system of record (e.g., IT asset management database) is accessed for a current snapshot of which assets are PCI and non-PCI. For example, one or more attributes such as a tag, label, identifier, or other metadata may be associated with each asset, denoting whether the asset is a PCI or non-PCI asset (e.g., an asset is tagged as in or out of scope for PCI). The location of a PCI and/or non-PCI asset is subject to change. PCI assets may be managed by hypervisors ranging from the same hypervisor to different hypervisors running on different physical hosts geographically remote from each other. For example, changes occur when an entire virtual machine is moved from one physical host to another physical host, such as during a data center failover for disaster recovery.

Security policies do not necessarily reflect government or industry mandated requirements, but rather security "best practices." By way of non-limiting examples, security policies include "do not allow high-risk assets to communicate with high-value assets" (e.g., symbolically: high risk↮ high value) and "do not allow pre-production assets to communicate with production assets" (e.g., symbolically: pre-production↮ production). Assets include a physical host, VM, or both. Examples of high-risk assets include a test development system, a security compromised system, and the like. Examples of high-value assets include enterprise resource planning (ERP) systems, point of sale (POS) systems, and the like. In some embodiments, high risk assets, high-value assets, and the like are denoted by one or more attributes.

In some embodiments, declarative policies (alternatively or additionally) refer to application life cycle states. For example, application life cycle states include requirements, design, construction, testing, debugging, deployment, maintenance, and the like. In various embodiments, life cycle states are denoted by one or more attributes. Life cycle states are subject to change. For example, today's test system is tomorrow's production system. In various embodiments, determinations (e.g., of application life cycle state) include access of an external system of record (e.g., application life-cycle management system) at compile time.

Tenant policies reflect a request from application developers to access particular services. Whereas security and compliance risk policies are generally negative (e.g., communication is prohibited), application or tenant policies are generally positive (e.g., certain communications are requested), because application developers typically think in terms of the services used by an application. By way of non-limiting example, for a new email server the applications developer requests access to at least one DNS, Simple Mail Transfer Protocol (SMTP), and Lightweight Directory Access Protocol (LDAP) services. Optionally, at least one of Internet Message Access Protocol (IMAP), Post Office Protocol (POP), Messaging Application Programming Interface (MAPI), and Secure Sockets Layer (SSL) services is offered.

At step 320, information (e.g., attributes) is collected from external systems of record. External systems of record include one or more of an HR database, change management database, application lifecycle management system, IT asset management database, custom database, and the like. By way of non-limiting example, external systems of record are at least one of: Microsoft Active Directory (AD), ServiceNow, VMware vCenter, Apache CloudStack, OpenStack, and the like.

At step 330, the declarative policy is compiled, using the information from external systems of record, to produce a firewall rule set. Compilation is described further in relation to FIG. 4.

At step 340, the (low-level) firewall rule set is optionally checked and corrected, for example, for at least one of existence (e.g., is a group of PCI assets defined), consistency/conflicts (e.g., is an asset defined as both a PCI and non-PCI asset), irrelevant/redundant/overlapping (e.g., rule does not contribute to security policy) and the like.

At step 350, the firewall rule set is provided to at least one of a hardware firewall and a distributed firewall enforcement point. For example, the firewall rule set is automatically pushed out to the at least one of a hardware firewall and a distributed firewall enforcement point. In some embodiments, the firewall rule set is provided to an enforcement point (EP) and/or enforcement point inspector (EPi). EP and EPi are described further in related U.S. patent application "Methods and Systems for Orchestrating Physical and Virtual Switches to Enforce Security Boundaries" (application Ser. No. 14/677,827), which is hereby incorporated by reference for all purposes. The at least one hardware firewall and distributed firewall enforcement point to which the firewall rule set is deployed is determined when the declarative policy is compiled, as described further in relation to FIG. 4.

Method 300 repeats at Step 310 or Step 320. In this way, the declarative policy is dynamically evaluated to remain up-to-date with changes to the physical hosts and/or VMs. In some embodiments, dynamic re-compilation (also referred to as refresh) of method 300 is at least one of manual and automated. For example, the IT security staff member triggers compilation and evaluation by providing indicia (e.g., clicking on a "commit" button provided in a GUI). A subsequent manual refresh may be received from the IT security staff member, for example, when a new workload (e.g., VM) is added, because attributes of the current and new workloads change. By way of further non-limiting example, refresh automatically occurs after a configurable time interval having a default value. Another example is that refresh automatically or manually occurs when a change to underlying values occur (e.g., which system(s) are high risk changes).

Figure 4:
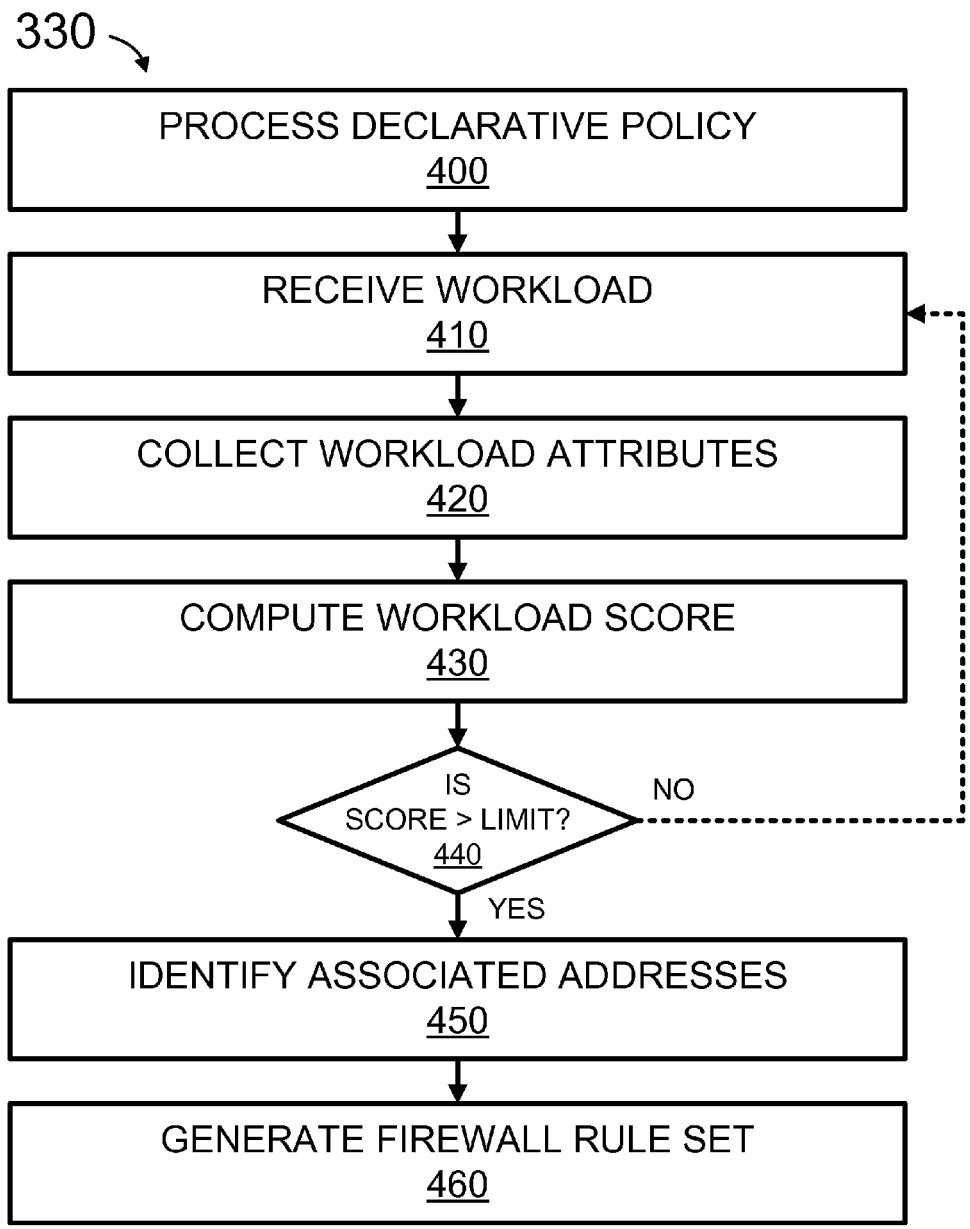
FIG. 4 is simplified flow diagram of a method, in accordance with various embodiments.

FIG. 4 illustrates a method for compiling a declarative policy 330, according to some embodiments. By way of non-limiting example, method 330 is described in relation to the security policy "do not allow high-risk assets to communicate with high-value assets" (e.g., symbolically: high risk↛high value).

At Step 400, the declarative policy is processed to produce at least one compiled rule. The declarative policy can be evaluated and selectively applied at compile time. For example, some declarative policies, such as compliance policies which are always adhered to, are always applied/compiled. Other policies are selectively applied using conditions (e.g., time) and at least one attribute. For example, a declarative policy may be in force between 9:00 AM and 5:00 PM, so the declarative policy is definitely applied/compiled if the compile time is between 9:00 AM and 5:00 PM and otherwise the declarative policy is not compiled or compiled anyway (e.g., do not care).

By way of further non-limiting example, a declarative policy is applied/compiled using attack relevance (e.g., using the workload operating system, such as communication destined for Microsoft Windows-specific services are not applied/compiled when coming at a Linux host). Another non-limiting example is risk scoring asset value (e.g., a different level of security is provided to a high-value asset such as a core order processing system as opposed to a non-high-value asset such as a test development system).

In some embodiments, a declarative policy tagged/labelled such that the compiler can determined under which conditions (if any) the declarative policy is applied. An Extensible Markup Language (XML) style tagging system may be used including tags for at least one of workload names, time, value, and the like.

In some embodiments, a compiled rule is a collection of access attributes. For example, access attributes include at least one of source IP address, source port, destination IP address, destination port, destination protocol, and action (e.g., permit/forward, deny/block, redirect, etc.). An Internet Protocol (IP) address is a numerical label assigned to each device (e.g., physical host, VM, printer, and the like) participating in a computer network that uses the Internet Protocol for communication. A port is a software construct serving as a communications endpoint in a physical host's and/or VM's operating system. A port is generally associated with an IP address of a physical host and/or VM and the protocol type of the communication.

At Step 410, one or more workloads are received. A workload is an instance of a VM. In some embodiments, the received workloads are received from an external system of record, such as a system for managing VMs (e.g., VMware vCenter, Apache CloudStack, OpenStack, and the like).

At Step 420, workload attributes are collected. In some embodiments, workload attributes are collected from at least one of an external system of record and analysis of network behavior (e.g., an SMTP server communicates using various protocols such as SMTP, IMAP, DNS, and the like). Workload attributes are associated with a workload and include at least one of: application name, application risk, application owner, time created, business owner, business purpose, asset value, PCI, non-PCI, relative confidentiality of associated data, device configuration and/or posture (e.g., OS version, patch level, system type, etc.), Internet Protocol (IP) address, DNS name, compliance-related attributes (e.g., for the Health Insurance Portability and Accountability Act of 1996 (HIPAA), Federal Information Security Management Act of 2002 (FISMA), etc.), and the like. Application risk is the risk associated with the workload. For example, "high" risk workloads include telnet, FTP, and the like. "Low" risk workloads include Secure Shell (SSH). In some embodiments application risk is a number range, such as low risk is 0 and high risk is 5. Application risk can be any other range of (whole and/or fractional) numbers to denote high to low (and low to high) application risk.

In various embodiments, a network topology is determined from information provided by at least one at least one of an external system of record and analysis of network behavior. Using the determined network topology, at least one appropriate hardware and/or distributed firewall enforcement point to deploy the firewall rule set is determined.

Time created can be a date (and time) stamp from which an age of the workload can be determined (e.g., one month old, one week old, created yesterday, created today, etc.). Owner can denote role/responsibilities of the owner; such is an employee, IT administrator, developer, no owner associated, and the like.

In some embodiments, attributes are qualitative (and subsequently quantified). By way of example and not limitation, asset value is "high," "medium," or "low;" PCI property is PCI or non-PCI; and production status is pre-production or production.

At step 430, a workload score for each workload is computed using the workload attributes. In some embodiments, each workload attribute is quantified (e.g., expressed as a whole and/or fractional number) within a predefined range of numbers, and any range of numbers can be used. Values of the workload attributes are evaluated to determine a numerical score associated with the workload. For example, a sum, average, weighted average, and the like is calculated using the workload attribute values to produce the score. The range of score values can be any range of numbers, for example, the score can be in the range of 0 to 99.

At Step 440, the score is compared to a predetermined threshold (also referred to as a limit). Although greater than is shown in FIG. 4, other comparisons (e.g., greater than or equal to, equal to, less than, and less than or equal to) may be used. The predetermined threshold is a number above which the associated workload is considered high risk. The predetermined threshold can be any number in the range of score values, such as 75 in a range of 0 to 99. Using the comparison, the associated workload is determined to be high risk or not (e.g., low risk). In response to a high risk determination, method 330 continues to Step 450. In response to a not high risk determination, method 330 optionally continues to Step 410 where a different workload is identified.

At Step 450, at least one of (IP) addresses, port numbers, and the like associated with the workload are identified.

At Step 460, a (low-level) firewall rule set is generated using the identified at least one of (IP) addresses, port numbers, and the like, and the compiled rule. For example, a firewall rule includes the identified (IP) addresses as a source IP address and/or destination IP address, a source port, a destination port, a destination protocol, and action (e.g., permit/forward, deny/block, redirect, etc.), in accordance with the compiled rule. In some embodiments, the firewall rule allows a connection to a specific (IP) address, allows a connection to a specific (IP) address if the connection is secured (e.g., using IPsec), denies a connection to a specific (IP) address, redirects a connection from one IP address to another IP address, logs communications to and/or from a specific IP address, and the like. By way of further non-limiting example, the firewall rule set is symbolically represented as: 10.0.0.3 ↦ 10.1.2.3, 10.0.2.3 ↦ 10.1.2.3, etc.

Various embodiments of the present invention offer the benefits of preventing East-West lateral spread (e.g., by controlling traffic between assets), enabling higher utilization of cloud servers (e.g., different tenants/VMs can operate in the same physical host and/or rack of physical hosts), adapting to changes in physical and virtual asset allocation (e.g., through dynamic re-compilation), and empowering IT security staff to control firewalls using intent and desired outcome (e.g., by generating low-level firewall rules from a high-level declarative policy).

Declarative policies according to some embodiments advantageously do not require definition of the enforcement point (e.g., hardware and/or distributed firewall enforcement point). Instead, the enforcement point—to which the firewall rule set is deployed—is determined as described in relation to FIG. 4.

Figure 5:
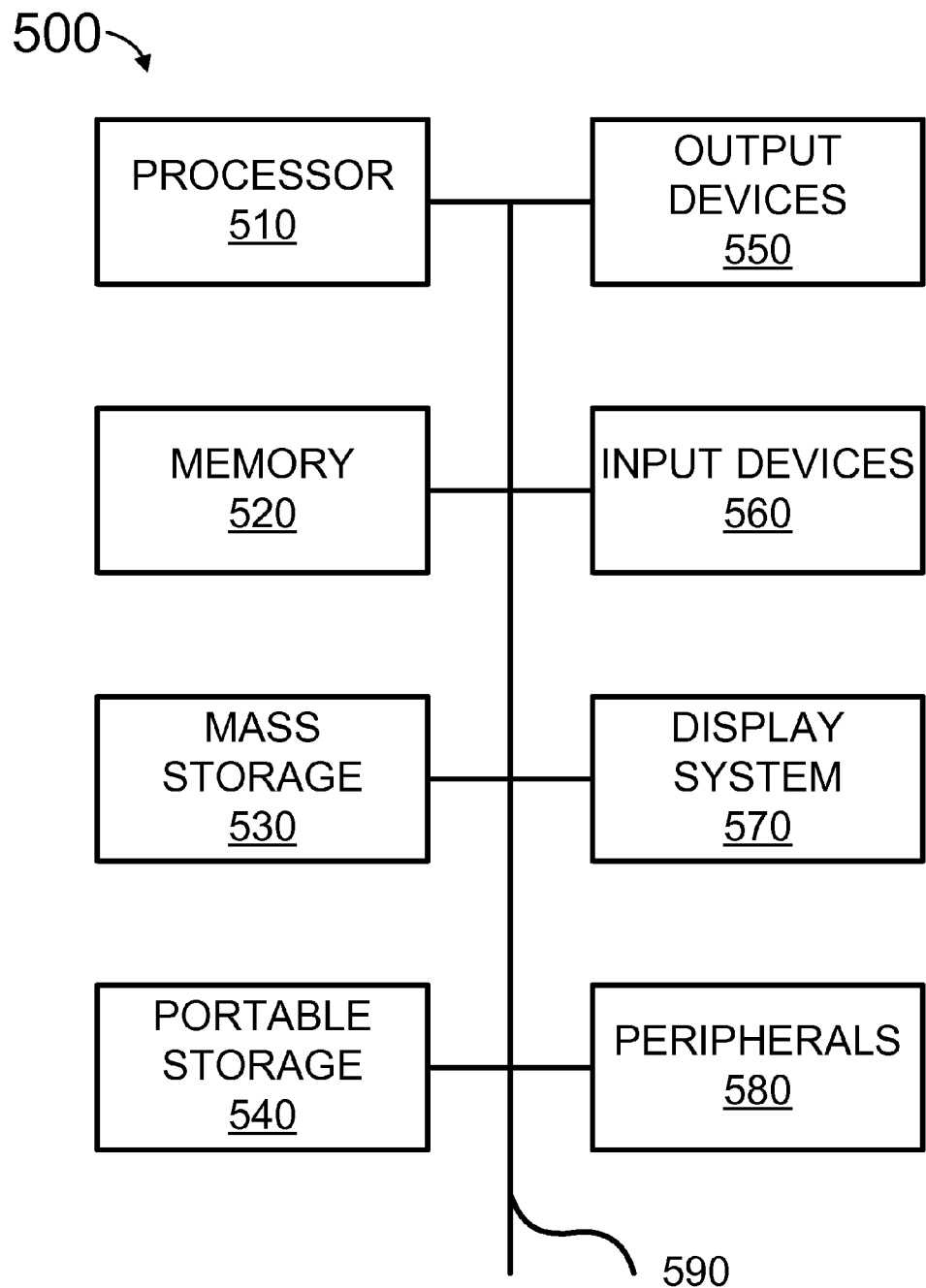
FIG. 5 is a simplified block diagram of a computing system, according to various embodiments.

FIG. 5 illustrates an exemplary computer system 500 that may be used to implement some embodiments of the present invention. The computer system 500 in FIG. 5 may be implemented in the contexts of the likes of computing systems, networks, servers, or combinations thereof. The computer system 500 in FIG. 5 includes one or more processor unit(s) 510 and main memory 520. Main memory 520 stores, in part, instructions and data for execution by processor unit(s) 510. Main memory 520 stores the executable code when in operation, in this example. The computer system 500 in FIG. 5 further includes a mass data storage 530, portable storage device 540, output devices 550, user input devices 560, a graphics display system 570, and peripheral device(s) 580.

The components shown in FIG. 5 are depicted as being connected via a single bus 590. The components may be connected through one or more data transport means. Processor unit(s) 510 and main memory 520 are connected via a local microprocessor bus, and the mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit(s) 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk, digital video disc, or Universal Serial Bus (USB) storage device, to input and output data and code to and from the computer system 500 in FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 include a liquid crystal display (LCD) or other suitable display device. Graphics display system 570 is configurable to receive textual and graphical information and processes the information for output to the display device.

Peripheral device(s) 580 may include any type of computer support device to add additional functionality to the computer system.

The components provided in the computer system 500 in FIG. 5 are those typically found in computer systems that may be suitable for use with embodiments of the present disclosure and are intended to represent a broad category of such computer components that are well known in the art. Thus, the computer system 500 in FIG. 5 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 500 may be implemented as a cloud-based computing environment, such as a virtual machine operating within a computing cloud. In other embodiments, the computing system 500 may itself include a cloud-based computing environment, where the functionalities of the computing system 500 are executed in a distributed fashion. Thus, the computing system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 500, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for producing a firewall rule set comprising:
   receiving a declarative policy associated with a computer network security policy, the declarative policy being high risk assets are not allowed to communicate with high value assets, the high risk assets being at least insecure assets, the high value assets comprising customer data, the declarative policy including at least one predetermined category and action associated with the at least one predetermined category, the at least one predetermined category indicating a plurality of workloads, the action being at least one of forward, block, redirect, and log;
   collecting information from at least one external system of record, the information associated with the at least one predetermined category;
   generating a firewall rule set using the declarative policy and the information, the firewall rule set including workload addresses to or from which network communications are at least one of forwarded, blocked, redirected, and logged, the firewall rule set being at a lower level of abstraction than the declarative policy; and
   provisioning the firewall rule set to a plurality of enforcement points of a distributed firewall, each enforcement point policing the network communications among respective workloads using the firewall rule set, the provisioning including sending an update to at least one hypervisor, the update including the firewall rule set.

2. The computer-implemented method of claim 1 wherein the declarative policy is received through at least one of a graphical user interface, a command line interface, and an application programming interface.

3. The computer-implemented method of claim 2 wherein the declarative policy is received in a tabular form.

4. The computer-implemented method of claim 1 wherein the information includes assets in a computer network, a risk level, and a value associated with each asset.

5. The computer-implemented method of claim 1 wherein the generating comprises:
   receiving a workload associated with the declarative policy;
   determining attributes associated with the workload using the information;
   computing a score using the attributes;
   comparing the score to a predetermined threshold;
   identifying addresses associated with the workload, in response to the comparison; and
   producing the firewall rule set using the addresses associated with the workload.

6. The computer-implemented method of claim 5 wherein the score is further computed using a sum of the attributes.

7. The computer-implemented method of claim 1 further comprising:
   checking the firewall rule set for at least one of a conflict and overlap among the workload addresses; and
   correcting the firewall rule set in response to finding the at least one of a conflict and overlap.

8. The computer-implemented method of claim 1 further comprising:
   re-collecting th information from the at least one external system of record, in response to at least one of an input from a user, an input from another external system of record, and a predetermined amount of time elapsing; and
   re-generating the firewall rule set using the declarative policy and the re-collected information, the firewall rule set including addresses to or from which the network communications are not permitted.

9. A system for producing a firewall rule set comprising:
   a processor; and
   a memory communicatively coupled to the processor, the memory storing instructions executable by the processor to perform a method comprising:
      receiving a declarative policy associated with a computer network security policy, the declarative policy being high risk assets are not allowed to communicate with high value assets, the high risk assets being at least insecure assets, the high value assets comprising customer data, the declarative policy including at least one predetermined category and action associated with the at least one predetermined category, the at least one predetermined category indicating a plurality of workloads, the action being at least one of forward, block, redirect, and log;
      collecting information from at least one external system of record, the information associated with the at least one predetermined category;
      generating a firewall rule set using the declarative policy and the information, the firewall rule set including workload addresses to or from which network communications are at least one of forwarded, blocked, redirected, and logged, the firewall rule set being at a lower level of abstraction than the declarative policy; and
      provisioning the firewall rule set to a plurality of enforcement points of a distributed firewall, each enforcement point policing the network communications among respective workloads using the firewall rule set, the provisioning including sending an update to at least one hypervisor, the update including the firewall rule set.

10. The system of claim 9 wherein the declarative policy is received through at least one of a graphical user interface, a command line interface, and an application programming interface.

11. The system of claim 10 wherein the declarative policy is received in a tabular form.

12. The system of claim 9 wherein the information includes assets in a computer network, a risk level, and a value associated with each asset.

13. The system of claim 9 wherein the generating comprises:

receiving a workload associated with the declarative policy;

determining attributes associated with the workload using the information;

computing a score using the attributes;

comparing the score to a predetermined threshold;

identifying addresses associated with the workload, in response to the comparison; and producing the firewall rule set using the addresses.

14. The system of claim 13 wherein the score is further computed using a sum of the attributes.

15. The system of claim 9 further comprising:

re-collecting the information from the at least one external system of record, in response to at least one of an input from a user, an input from another external system of record, and a predetermined amount of time elapsing; and re-generating the firewall rule set using the declarative policy and the re-collected information, the firewall rule set including addresses to or from which the network communications are not permitted.

16. A non-transitory computer-readable storage medium having embodied thereon a program, the program being executable by a processor to perform a method for producing a firewall rule set, the method comprising:

receiving a declarative policy associated with a computer network security policy, the declarative policy being high risk assets are not allowed to communicate with high value assets, the high risk assets being at least insecure assets, the high value assets comprising customer data, the declarative policy including at least one predetermined category and action associated with the at least one predetermined category, the at least one predetermined category indicating a plurality of workloads, the action being at least one of forward, block, redirect, and log;

collecting information from at least one external system of record, the information being evaluated and associated with the at least one predetermined category;

generating a firewall rule set using the declarative policy and the information, the firewall rule set including workload addresses to or from which network communications are at least one of forwarded, blocked, redirected, and logged, the firewall rule set being at a lower level of abstraction than the declarative policy; and provisioning the firewall rule set to a plurality of enforcement points of a distributed firewall, each enforcement point policing the network communications among respective workloads using the firewall rule set, the provisioning including sending an update to at least one hypervisor, the update including the firewall rule set.

* * * * *